July 20, 1965 P. F. KOEHLY ETAL 3,196,304
PROTECTIVE MEANS FOR INSULATION
Original Filed Jan. 23, 1961 2 Sheets-Sheet 1

INVENTORS
Paul F. Koehly
BY Earl C. Walters, Jr.
Their Attorney

July 20, 1965 P. F. KOEHLY ETAL 3,196,304
PROTECTIVE MEANS FOR INSULATION
Original Filed Jan. 23, 1961 2 Sheets-Sheet 2

INVENTORS
Paul F. Koehly
BY Earl C. Walters, Jr.

Albert H. Reuther
Their Attorney

United States Patent Office 3,196,304
Patented July 20, 1965

3,196,304
PROTECTIVE MEANS FOR INSULATION
Paul F. Koehly and Earl C. Walters, Jr., Dayton, Ohio, assignors to General Motors Corporation, Detroit, Mich., a corporation of Delaware
Original application Jan. 23, 1961, Ser. No. 84,189, now Patent No. 3,097,320, dated July 9, 1963. Divided and this application Nov. 6, 1962, Ser. No. 235,780
1 Claim. (Cl. 310—194)

This invention relates to measures for protection of insulation on metal components and particularly, to avoidance of breakdown and failure of insulating material along edges of tooth-like radial projections of metal which define slots to be fitted with conductive windings for retention therein.

This is a division of parent application S.N. 84,189—Koehly, et al., filed January 23, 1961, now Patent 3,097,320—Koehly et al., issued July 9, 1963, and belonging to the assignee of the present invention.

An object of this invention is to provide new and improved laterally projecting means on teeth of insulation-covered magnetic cores to be protected against breakdown and failure detrimental to performance and satisfaction in quality as well as reliability of a product provided therewith.

Another object of this invention is to provide a toothed lamination assembly having embossed projections to eliminate sharp edges along which an insulating covering can fail and to have a substantially U-shaped cross-section with an outer surface coverable with material such as epoxy and the like.

Another object of this invention is to provide a toothed lamination assembly having laterally projecting means cast of material such as aluminum and the like to form an integral hub portion as well as curved portion between the hub and projecting means so as to permit substantially uniform coating thereof with insulating material such as epoxy and the like.

A further object of this invention is to provide a method and means of having a cast hub with radial ribs in alignment with each of a plurality of teeth between winding slots and adaptable to include an outer end hook to avoid winding slip-off on a dynamoelectric machine component such as a stator provided with fluidized-bed applied insulation material such as epoxy that substantially uniformly covers at least the radial ribs and teeth.

Another object of this invention is to provide a toothed lamination assembly having laterally projecting rib means cast in alignment with a plurality of teeth to define winding slots and extending radially for substantially rounding corners about which windings can be fitted relatively free of sharp edges where insulation failure would previously occur and simultaneously providing smooth and gradual surfaces onto which uniform coating of insulation can be added subsequent to de-greasing thereof after casting.

Further objects and advantages of the present invention will be apparent from the following description, reference being had to the accompanying drawings wherein preferred embodiments of the present invention are clearly shown.

Use of slotted laminated components covering with a substantially uniform coating of plastic particles made of material such as nylon, polyethylene, epoxy resin, arcylics, vinyls and the like suspended in a solid state in a gaseous medium is disclosed in co-pending applications S.N. 64,324 filed October 24, 1960, now abandoned, as well as S.N. 737,590 filed May 26, 1958, now abandoned, and both belonging to the assignee of the present invention. Previously it was customary to fit individual slot liners into space between teeth of laminated assemblies used to form a dynamoelectric machine stator or rotor component. These separable slot liners can add to cost and time required for manufacture of a slotted lamination assembly or component. However, use of the separate slot liners would generally avoid electrical shorting due to damage of insulation as conductors or wiring were fitted tightly into the slots of a particular dynamoelectric machine component. Generally, such a lamination assembly is formed by forming a stack of slotted pieces generally aligned relative to each other and suitably held together such as by welding, rivets, through bolts and other fastening means also to be used in accordance with the present invention. However, as an improvement the present invention relates to modification of structure adjacent to or integrally with a pair of opposite end laminations so as to avoid sharp edges which can contribute to failure and breakdown of electrical insulation including insulating coverings of wiring as well as inculating plastic material that is substantially uniformly coated over metal edges and surfaces of a slotted lamination assembly or component. Features of the present invention can be incorporated on dynamoelectric machines having inside-out stator and rotor arrangements as disclosed for a ventilating means of copending application S.N. 816,560—Levy et al., filed May 28, 1959, now Patent 2,990,112 issued June 27, 1961, as well as to dynamoelectric machines arranged more conventionally to have a stator component located concentrically and radially outside a rotor component journalled centrally thereof.

Figure 1:
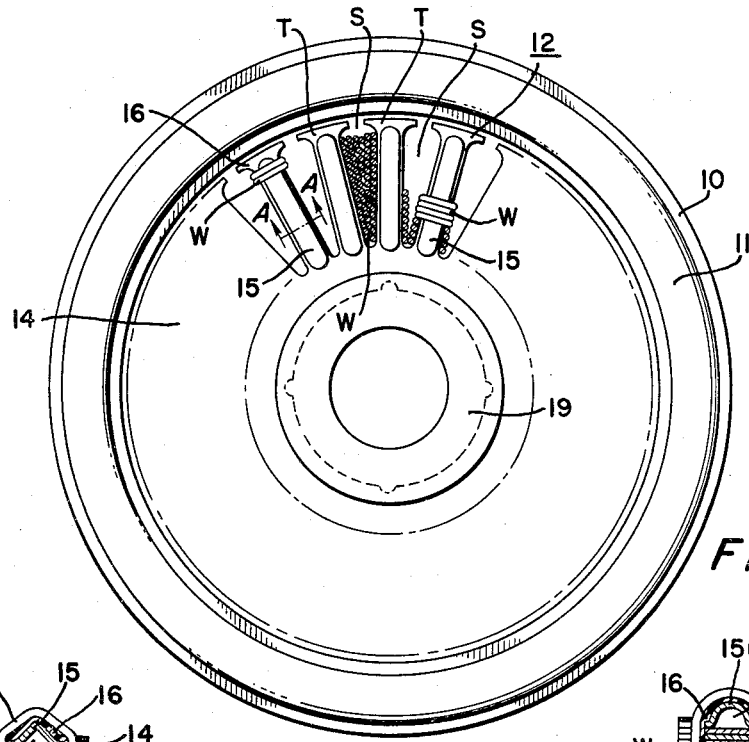
FIGURE 1 is an end view of a dynamoelectric machine having one component with slot-forming teeth having laterally projecting means embossed in an end lamination in accordance with the present invention.
Figure 2A:
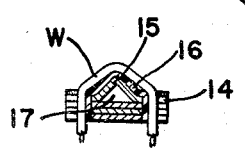
FIGURE 2A represents one embodiment in a fragmentary cross-sectional view taken along line A—A in FIGURE 1.
Figure 3A:
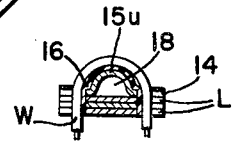
FIGURE 3A represents another embodiment in another fragmentary cross-sectional view also taken along line A—A in FIGURE 1.

For purposes of illustration, features of the present invention are shown on an inside-out type stator and rotor arrangement with reference to FIGURE 1 wherein a laminated rotor assembly or component 10 is provided with cast end ring means 11 which form part of a so-called squirrel-cage winding including conductor bars that pass through aligned slots of the rotor 10 in a well-known manner. Suitable ventilating blades and fan means can be mounted or formed integrally on this rotor 10 in accordance with the copending application S.N. 816,560, now Patent 2,990,112, identified earlier. Located radially inside this rotor 10 there is a stator subassembly or component generally indicated by numeral 12 and including a plurality of sheet metal laminations L each having radially located slots S substantially longitudinally aligned with each other and adapted to be fitted with conductive wiring or windings W having a suitable insulating covering thereon. Each of the sheet metal laminations L as well as end lamination 14 includes a plurality of teeth T radially displaced a predetermined angular distance from each other and defining the slots S. The stator component 12 includes a pair of opposite end laminations 14 also having slots as defined by teeth complementary to slots and teeth of laminations L. However, each of the teeth of each end lamination 14 differs from teeth of the laminations L in that there is provided a laterally outwardly projecting and radially extending embossed portion 15 substantially longitudinally in alignment with each of the teeth such as T in only each of the end laminations on opposite sides of the stack of laminations L. A plastic coating of insulating material 16 provides a substantially uniform covering that extends over and around this embossed portion 15 as well as edges of the sheet metal laminations L and surfaces thereof. FIGURE 2A shows a fragmentary cross-sectional view of one of these teeth of the end lamination 14 and more particularly an embossed portion 15 having a V-shape below which there is an open space 17. FIGURE 3A illustrates a slightly modified structure in which there is a U-shaped cross-sectional embossed portion 15–U around which conductor wiring W can be looped without encountering any sharp edges or bends since the V-shaped or U-shaped embossed portions provide a substantially rounded backing covered with an insulating coating 16. The U-shaped embossed portion shown in FIGURE 3A has an open space 18 thereunder. Thus the coating 16 of insulating material such as epoxy has a substantially rigid backing for rounding of corners adjacent to end lamination teeth. The laminations L as well as end laminations 14 can be mounted on a suitable sleeve or hub member 19 in a manner similar to that disclosed in copending application S.N. 816,560, now Patent 2,990,112, identified earlier.

Figure 4:
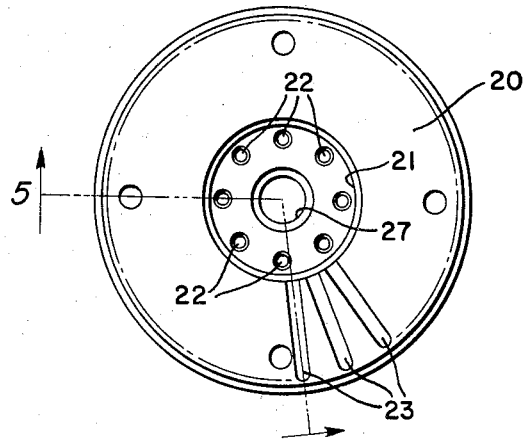
FIGURE 4 is an end view of die means for use in casting laterally projecting ribs in alignment with slot-forming teeth in accordance with the present invention.
Figure 5:
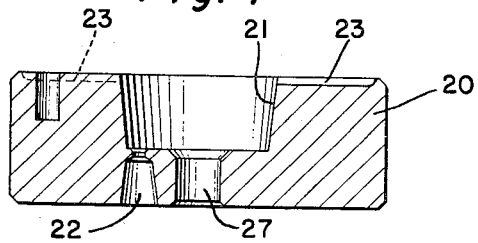
FIGURE 5 is a cross-sectional view of the die means taken along line 5—5 in FIGURE 4.
Figure 6:
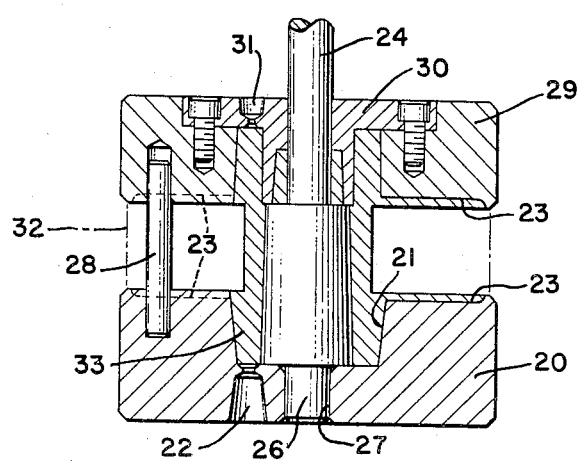
FIGURE 6 represents casting of molten metal such as aluminum into die means assembled for integrally forming a lamination hub portion and laterally projecting rib means in accordance with the present invention.

In some instances it has been found that provision of a coating of insulating material, such as 16, when applied to end laminations provided with embossed portions and open spaces such as 17 and 18, there can be objectionable pin-size holes along an underside of the end lamination edges or teeth. A possibility exists that this minor imperfection results from presence of the open spaces 17 and 18 below the embossing in which a temperature differential can arise due to heating of the lamination assembly for application of the insulating coating 16 as disclosed in application S.N. 64,324 identified earlier. Apparently, some heated air can be trapped in the open spaces 17 and 18 and covering of the surfaces and edges with a sufficiently thick layer of insulating material 16 can generally overcome presence of such pin-size holes through which such "breathing" can occur. However, by use of a procedure involving die parts for casting of molten metal such as aluminum into a hub structure for the laminations such as L it is possible to provide structural features in accordance with the present invention and further avoid any irregularities including thinning of the insulation coating 16 in corners and along edges. FIGURE 4 illustrates a plan view of a die means 20 having a central recess 21 connected with axial sprue passages 22. This die means 20 is shown also in views of FIGURES 5 and 6. The die means 20 has a plurality of radially outwardly extending recesses 23 into which molten metal can be cast integrally with metal used to form a hub portion around a central support member or shaft 24 that can have an enlarged mid-portion 25 and an end 26 adapted to complement a central aperture 27 of the die part 20. Four or more dowels 28 can be used to hold die means 20 in a predetermined location with respect to a secondary die means 29 that can be fitted with a centrally apertured cover plate 30 having a passage 31 therein through which molten metal can be cast into the die means. It is to be noted that radially extending recesses 23 are to be provided in both the die means 20 and 29 so as to form raised portions or ribs to extend laterally outwardly and longitudinally in alignment with teeth such as T of a stator component 32 illustrated in FIGURE 7 and adapted to fit between the die parts or means 20 and 29 as indicated in FIGURE 6. A cast metal annular hub portion 33 is formed by use of these die means 20 and 29 which simultaneously can form cast ribs or laterally outwardly extending projecting means 34 in alignment with each of the teeth T and extending longitudinally thereof. The radially inner ends of these ribs 34 are integral with the cast hub portion 33. It has been found that the cast metal such as aluminum used in the hub portion as well as the rib means 34 sticks to sides of the flat end laminations which are subsequently covered with an insulation coating 36 shown in FIGURES 7X, 8 and 9. This covering of insulating material is provided in accordance with the copending applications identified earlier and covers not only the hub portion 33 but also the rib means 34 as indicated in certain views of the drawings. The rib means 34 can have any suitable cross-section and preferably have a substantially U-shaped exterior surface over which the insulation covering 36 is added. Thus the wiring or winding W has a rounded backing adjacent to the end laminations because of the provision of the rib means 34 extending laterally outwardly as well as longitudinally in alignment with each of the teeth such as T. It is to be noted that suitable de-greasing of the cast metal and laminations should occur prior to adding of an insulating covering in a substantially uniform layer over surfaces of the stator assembly such as 32.

Figures 7, 7X, 8, 9:
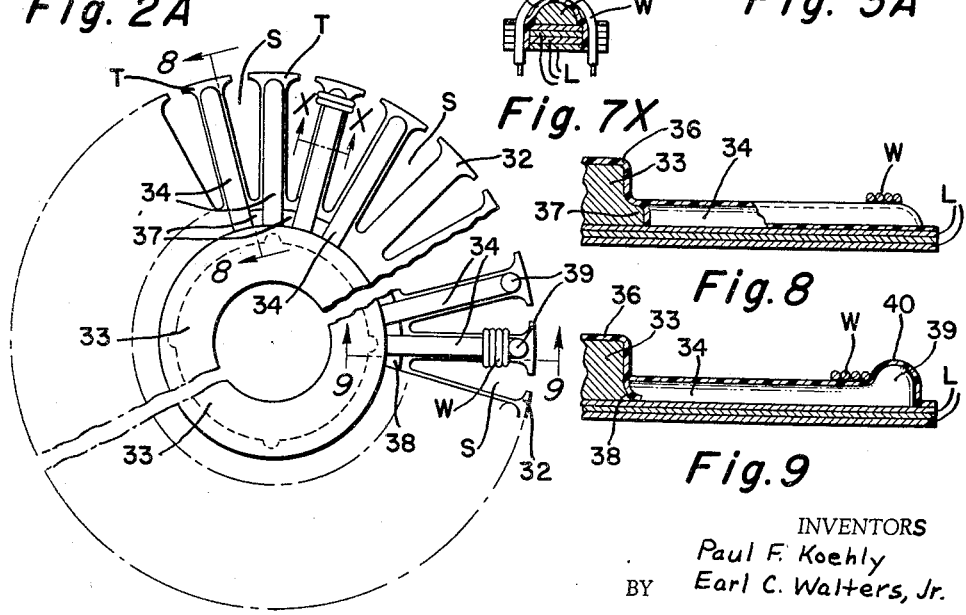
FIGURE 7 is an end view of a dynamoelectric machine component having a hub portion and rib means cast therein and divided diagonally to illustrate differing embodiments.
FIGURE 7X is a cross-sectional view taken along line X—X in FIGURE 7.
FIGURE 8 is a cross-sectional view taken along line 8—8 in FIGURE 7.
FIGURE 9 is a cross-sectional view taken along line 9—9 in FIGURE 7.

It is to be understood that junctures of the rib means 34 at a radially inner location thereof integral with the hub portion 33 results in corners which are hard to fill and cover with an insulating coating such as 36 and therefore intermediate shoulder means such as 37 and 38 can be cast between the rib means 34 and hub portions 33 on opposite sides with respect to flat end laminations. The shoulders 37 are substantially convex in cross-section as indicated by FIGURE 8 whereas the shoulders 38 are concave in cross-section as shown in FIGURE 9. In view of presence of limited sharpness of corners between the shoulders 37 and hub portion 33 as well as end lamination L and rib means 34 there is still some possibility for slight irregularity in covering and filling with the insulating material 36 in the configuration shown by FIGURE 8. Thus the preferred structure is that shown in FIGURE 9 wherein substantially all junctures of the shoulders 38 with the hub portion 33 and rib means 34 on each end lamination are relatively smooth and gradual and adapted for uniform coating with plastic particles of insulating material as noted earlier.

In a lower portion of the structure illustrated by FIGURE 7 as well as in the cross-sectional view of FIGURE 9 there is also shown an outer hook end or projection 39 integral with and extending laterally from rib means 34. This hook end 39 results in an outward extension 40 of the insulation coating such as 36 and provides an abutment or stop for wiring or winding means W fitted around teeth defining slots S. The wiring or winding means W can be kept from slipping off of the teeth by provision of this stop portion 39–40 provided adjacent to an end of each of the cast rib means along each tooth. It is to be understood that embossings such as illustrated in FIGURES 2A and 3A can also be provided with such outwardly extending stop portions. Thus the embossings as well as the rib means together with the teeth of the dynamoelectric machine components become encapsulated in an insulating coating rounded off adjacent to end lamination teeth. A substantially uniform thickness of insulating material in the form of coatings 16 and 36 can be applied to the metal of the dynamoelectric machine components 12 and 32 and shoulders such as 37 and 38 avoid thinning and irregularity of such coating material. In most instances the embodiment of FIGURE 8 without the stop members 39–40 and with the convex-shoulders 37 provides adequate protection for wiring or winding means W fitted into slots S around teeth T. Use of the cast metal for integral formation of hub portion 33 as well as rib means 34 avoids formation of pin-size holes due to presence of any voids or open spaces since the rib means 34 are cast of solid metal. In any event, previously provided flat surfaces of end laminations are changed to outwardly projected end laminations having rib means or embossed portions radially in alignment with teeth such as T. For a twenty-four-slot stator component these teeth and also the embossed portions or rib means are substantially 15° apart mechanically.

It is to be noted that a possibility exists for utilizing the embodiments of FIGURES 8 and 9 both having cast rib means 34 as well as a cast hub portion 33 to further include a groove or slot as well as a passage drilled through a particular longitudinally aligned stack of teeth and casting molten metal into this groove or slot or passage so as to form one closed loop in at least one of the stack-ups of teeth between a pair of slots S. The loop can form a shading ring for displacement of electrical flux in this one stack-up of teeth and thus it is possible for a shaded-pole inside-out motor to be formed in addition to having the embossed portions and rib means as described earlier.

It is to be noted that the insulation coatings such as 16 and 36 applied over the edges and surfaces including the embossed portions and rib means can further enhance the holding together of the laminations as well as any cast metal parts added thereto. Thus the insulation coating 36 applied as shown in FIGURES 8 and 9 can aid in assuring maintenance of rib means 34 in lateral and longitudinally extending relationship to the teeth of opposite end laminations. Also it is to be noted that the wiring or winding means W once fitted into the slots S and around the rounded bends as backed by the embossed portions and rib means which are insulation covered will assure maintenance of positioning of these embossed portions and rib means in predetermined aligned relationship with respect to a particular stack-up of teeth. Insulation of the wiring or winding means W as well as the insulation coatings 16 and 36 are protected by provision of the rounded backing as provided by the embossed portions 15 as well as the rib means 34 that extend laterally outwardly and longitudinally with respect to the teeth radially integral with a stator lamination assembly or component. It is to be understood that embossed portions 15 as well as rib means 34 cast into position adjacent to end laminations can be used on a stator component as well as rotor means to be provided with wiring or windings W on either inside-out motors and generators as well as dynamoelectric machines having stators provided radially outside rotors.

While the embodiments of the present invention as herein disclosed constitute preferred forms, it is to be understood that other forms might be adopted.

What is claimed is as follows:

In a toothed lamination assembly including a stack of metal laminations each with radial teeth aligned axially of each other to form slots fitted with conductive windings which engage an insulation coating of epoxy resin material along the slots and around opposite end laminations each primarily embossed to project axially away from the slot-forming laminations only in alignment with the radial teeth, the improvement which comprises a secondarily embossed end abutment integral with the opposite end laminations for each of the teeth where primarily embossed to project axially away from the slot-forming laminations, each said secondarily embossed end abutment extending only axially for a predetermined distance as a stop for retention of windings in the slots as fitted therein against slipping off of the teeth radially outwardly thereof, each said secondarily embossed end abutment having the insulation coating of epoxy resin material encapsulated peripherally thereon including axially and radially thereof everywhere except in a direction toward the lamination teeth forming the slots and having an axially rounded off configuration spaced radially inwardly of outer peripheral endings of teeth as well as definitely less in width than individual tooth width so that each said secondarily embossed end abutment stops winding slip-off specifically in a location axially adjacent to the end laminations at a radially inward junction where primarily embossed for a width also less than individual tooth width so that the insulation coating of epoxy resin material is contoured integrally and uniformly to complement the opposite end laminations both where primarily embossed only radially of the teeth and where secondarily embossed at each said integral end abutment always for a width less than that of radially outer endings of the teeth.

References Cited by the Examiner
FOREIGN PATENTS 360,347 6/38 Italy.
950,481 10/56 Germany.

MILTON O. HIRSHFIELD, *Primary Examiner.*